A. HOLLINGSWORTH
Tire-Tighteners.
No. 152,491.  Patented June 30, 1874.
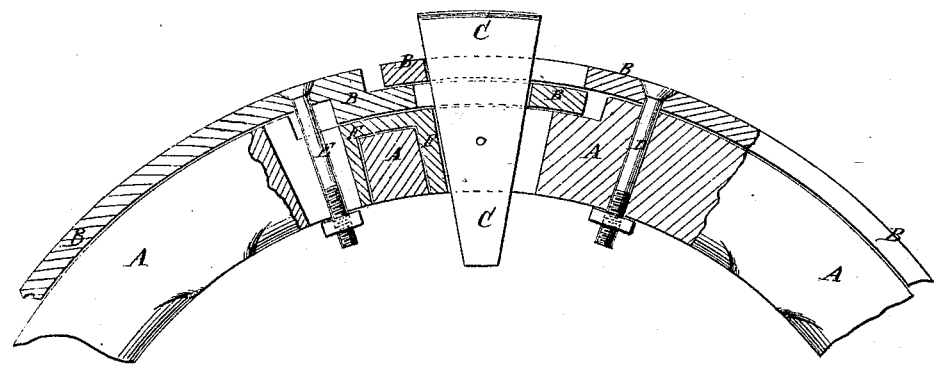
WITNESSES:
INVENTOR:
BY
ATTORNEYS.

UNITED STATES PATENT OFFICE.

ABSALOM HOLLINGSWORTH, OF ALBA, MISSOURI.

IMPROVEMENT IN TIRE-TIGHTENERS.

Specification forming part of Letters Patent No. 152,491, dated June 30, 1874; application filed April 18, 1874.

*To all whom it may concern:*

Be it known that I, ABSALOM HOLLINGSWORTH, of Alba, in the county of Jasper and State of Missouri, have invented a new and useful Improvement in Tire-Fasteners, of which the following is a specification:

The figure is a section of a portion of the rim of a wheel to which my improvement has been applied.

My invention has for its object to furnish an improved device for tightening and loosening the tires of wheels in dry and wet weather, as may be required to prevent the spokes from being sprung, which will enable the tire to be readily tightened when it becomes loose from wear, and which shall be simple in construction and easily operated.

The invention is an improvement in the class of tire-tighteners in which a wedge is employed to draw the two ends of the tire together.

The improvement relates, first, to providing both ends of the tire with lengthwise slots and the felly with radial slots, one to receive the wedge and the other to permit adjustment of a screw clamping-bolt; second, to a U-shaped bar or staple applied to the slotted end of the felly, to operate in conjunction with the tightening-wedge, as herein described.

A represents a felly of a wheel, and B represents the tire. The tire B is open, and has an offset or shoulder formed in it near one end, of a depth equal to the thickness of the tire, and which is let into the felly A, so that the wheel may be round, while the ends of the tire are overlapped. The overlapped ends of the tire B are slotted longitudinally to receive the wedge-key C, by which the tire is drawn tightly around the wheel, and which passes through a slot of the felly A. Instead of the offset or shoulder of the tire B, one end of the tire may be let into a tapering notch in the felly A, and the other end tapered, so that the wheel may be round, while the ends of the tire are overlapped. D is a bolt which passes through a hole in the tire B and in the felly A, to hold the end of the tire stationary while said tire is being tightened, and to keep said end from springing up while the wheel is being used. E is a bolt which passes through a hole in the tire B, and through a slot in the felly A, to prevent the other end of the tire from springing up. The nut of the bolt E must be loosened before the tire is tightened, the slot in the felly A then allowing the tire to move sufficiently. F is an iron staple or U-bar placed over the portion of the felly A between the slots for the key C and bolt E, for the key C to bear against and slide upon, to prevent it from cutting said felly.

When the tire is to be tightened, the wedge-key C is driven out and a block of suitable thickness placed at its edge, and the two are then driven in together; or the key C may be replaced by a wider or narrower key, according as the tire is to be tightened or loosened.

Having thus described my invention, I claim as new and desire to secure by Letters Patent—

1. The open tire B, having a shoulder on one end, and both ends slotted lengthwise, the screw-bolts E, and wedge C, in combination with the felly A, having two radial slots, one to receive the wedge and the other a clamp-bolt, all as shown and described.

2. The combination of the staple F with the slotted felly A, the overlapped and slotted open tire B, and the wedge-key C, substantially as shown and described.

ABSALOM HOLLINGSWORTH.

Witnesses:
ED. G. BATES,
D. S. WOODMANSEE.